US006304747B1

(12) United States Patent
Looström et al.

(10) Patent No.: US 6,304,747 B1
(45) Date of Patent: Oct. 16, 2001

(54) ANTENNA REFERENCE POINT

(75) Inventors: Lars Looström, Västra Frölunda; Anders Derneryd, Hisingsbacka, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/087,862

(22) Filed: Jun. 1, 1998

(30) Foreign Application Priority Data

Jun. 2, 1997 (SE) .................................................. 9702099

(51) Int. Cl.[7] .................................................. H04B 17/00

(52) U.S. Cl. ....................... 455/67.4; 455/226.1; 455/425

(58) Field of Search ......................... 455/501, 67.1–67.7, 455/560, 561, 562, 226.1–226.4, 227; 330/124 R, 124 D, 149, 2, 129; 342/165–174, 368–374, 73.1

(56) References Cited

U.S. PATENT DOCUMENTS

| | | | | |
|---|---|---|---|---|
| 5,038,146 | * | 8/1991 | Troychak et al. | 342/173 |
| 5,059,892 | * | 10/1991 | Stoft | 324/73.1 |
| 5,063,529 | | 11/1991 | Chapoton | 364/571.02 |
| 5,559,519 | * | 9/1996 | Fenner | 342/174 |
| 5,561,395 | * | 10/1996 | Melton et al. | 330/2 |
| 5,574,981 | * | 11/1996 | Ahonen | 455/67.4 |
| 5,604,462 | * | 2/1997 | Gans et al. | 330/124 R |
| 5,649,304 | * | 7/1997 | Cabot | 455/67.4 |
| 5,790,944 | * | 8/1998 | Karki et al. | 455/226.2 |

FOREIGN PATENT DOCUMENTS

| | | |
|---|---|---|
| 0 461 314 | 12/1991 | (EP) . |
| 0 762 541 | 3/1997 | (EP) . |

OTHER PUBLICATIONS

Audone, B. 'Interaction between test site and amplifier nonlinearities in susceptibility tests' IEEE, pp. 1–4, Aug. 1994.*

Panton, W.R. et al 'The noise performance of an active, linear antenna array for reception' IEEE Microwave Symposium, pp. 1–10, May 1994.*

* cited by examiner

*Primary Examiner*—Dwayne Bost
*Assistant Examiner*—Charles Craver
(74) *Attorney, Agent, or Firm*—Burns, Doane, Swecker & Mathis, L.L.P.

(57) ABSTRACT

A method and system of merging signals feeding the antenna elements by using a combiner network and to create an antenna reference point representing the signal representation in the air. This merged signal will be easily accessed for measurement purposes. An additional signal combiner connected to the output terminals of the distributed power amplifier modules of the active antenna creates a measured virtual antenna reference point which may be utilized in testing and typing active antennas having distributed electronics for a certification according to standards for GSM, PDC and DCS. The corresponding method for measuring active receive antennas is also disclosed. Also discloses a measurement system for application of the new method of obtaining a virtual transmit or receive antenna.

16 Claims, 4 Drawing Sheets

ANTENNA REFERENCE POINT

TECHNICAL FIELD

The present invention relates to a method and a measurement system for creating a virtual antenna reference point to be used in testing of active antennas containing distributed amplifier modules.

BACKGROUND

Today radio performance typing of the present generation of base stations according to standard requirements (for instance GSM, PDC and DCS) is performed by measurement in an antenna reference point. This point is defined by the current standard and is constituted by the antenna connector terminal and should regarding transmission be located after active electronics, but regarding reception be located before the electronics.

When utilizing active antennas having distributed amplifiers this approach leads to problems. Each transmitter and receiver module, respectively, is connected to one or more antenna elements and the merging of the signals takes place in the air. For this type of antennas a new type of antenna reference point must be defined.

One method of measurement could be to individually measure each radiating element interface and state a type acceptance for each unit as such. This would lead to a very large number of measurements and produce a result which would not be representative for the signal environment resulting of the merging in the air. The position in space and relative amplitudes of spuriouses and main signal will not be measured, however this is entirely of vital importance for the resulting signal representation.

Another method is to measure radiation pattern by means of an antenna test range. This method is very difficult as it is necessary to maintain a safe control of undesired disturbance sources. That is practically impossible as certain measurements are performed at signal levels of −110 dBm and less. If the measurements are performed in an unshielded room or outdoors it will be disturbed by present active mobile telephones and when performing transmit tests, telephone systems operating in the neighborhood may be disturbed by such a test.

There will be found a number of documents relating to calibration of phased array antennas, for instance U.S. Pat. No. 5,063,529 disclosing utilization of automated processing techniques to compute calibration coefficients based on a generalized model of the array. However the documents relating to such calibrations are not dealing with systems having active antennas with distributed amplifiers.

Therefore there is a large need for a new method for performing a reliable test method for an active antenna system containing distributed amplifiers for instance for use in base stations for radio telephone systems like GSM, PDC or DCS.

SUMMARY OF THE INVENTION

A method according to the present invention proving to be practically usable is a merging of signals feeding the antenna elements in transmit by means of a combiner network or feeding distributed low noise amplifiers by means of a combiner network substituting the antenna elements, to thereby create an antenna reference point. The result of this signal merging will be easily accessed for measurement purposes.

Consequently, the present invention discloses a method and a measurement system creating a virtual antenna reference point which for testing and typing active antennas having distributed electronics for a certification according to standards for GSM, DCS and PDC. The present method is set forth in the independent claim 1 and a measurement system for applying the method is set forth in the independent claims 11 and 12, while different embodiments of the method according to the present invention are set forth in the dependent claims 2–10.

BRIEF DESCRIPTION OF THE DRAWINGS

The objects, features and advantages of the present invention as mentioned above will become apparent from a detailed description of the invention to be contemplated with reference to the accompanying drawings wherein like reference numerals are used throughout to designate like parts. In the drawings.

DETAILED DESCRIPTION

Figure 1:
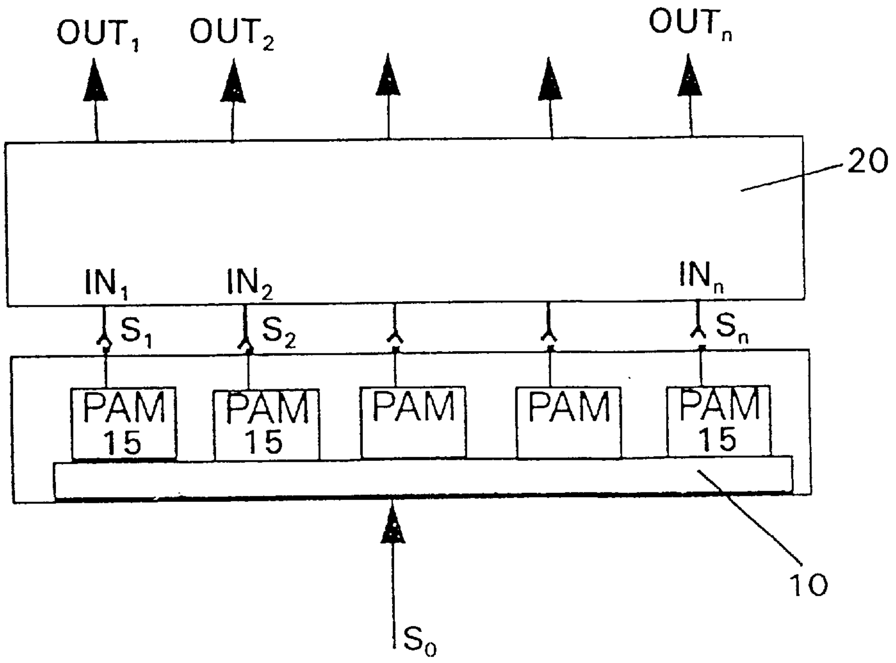
FIG. 1 illustrates an example of an arrangement according to the present invention for creating a virtual antenna reference point for an active transmit antenna.

The present invention demonstrates a new strategy for primarily testing transmitting performance of an active antenna system utilizing distributed power amplifiers. According to the method the output characteristics of the system are measured virtually by introducing an additional signal combiner network forming a spatial transform of a signal fed to the initial antenna system power distribution circuitry. FIG. 1 illustrates an example of a measurement arrangement for virtually measuring output characteristics of an active antenna transmit system having such a distributing circuitry 10 feeding distributed Power Amplifier Modules 15. The distributing circuitry 10 is provided with a test signal at input terminal $S_0$. According to the invention an additional combiner network 20 having a number of input and output terminals is introduced. Each one of the outputs $S_1, S_2 \ldots S_n$ of the distributed power amplifier modules 15 is feeding an input terminal $IN_1, IN_2 \ldots IN_n$ of the additional combiner network 20 instead of a normally connected radiation element or group of radiation elements. In a first basic embodiment the additional combiner network 20 constitutes for instance a Butler matrix having a number of input ports $IN_1, IN_2 \ldots IN_n$, and output ports $OUT_1, OUT_2 \ldots$ $OUT_n$ corresponding to the number of distributed power amplifier modules 15 of the active distributed antenna system to be measured.

When feeding a test signal to the input terminal $S_0$ of the distributing circuitry 10 of the active antenna transmit system, amplitude and phase values can be measured at the output ports $OUT_1$, $OUT_2$ . . . $OUT_n$ of the additional combiner network 20, while the ordinary radiating elements or groups of radiating elements are disconnected from the output terminals of the power amplifier modules 15. The additional signal combiner network 20 performs a spatial transform, preferably a Fourier transform, of the signal applied at $S_0$. It should be noted that each output terminal $OUT_1$, $OUT_2$ . . . $OUT_n$ corresponds to a direction in space. These directions are in a wellknown way defined by the realization of the combiner network 20 and by the internal distances of the radiating elements. The achieved measurements of amplitude and phase values then are, by means of a standard calculation method, used to obtain a calculated measure representing the performance of the active transmit antenna system. To establish a desired description of signal and signal characteristics of the corresponding antenna system, the measured amplitude and phase values additionally are combined in this calculation with the theoretically estimated or measured radiator system normally connected to the ports $S_1$, $S_2$ . . . $S_n$ of the distributed power amplifier module system. This will efficiently create a virtual antenna reference point which can be used for typing of active antenna transmit systems in quality certifications according to standards like GSM, DCS and PDC.

In the embodiment of FIG. 1 an active transmit antenna system having five power amplifier modules will be measured. The measurement is performed according to the state of the art using commercially available equipment to measure phase and amplitude at the output terminals of the additional combiner network 20, for instance a Butler matrix.

Figure 2:
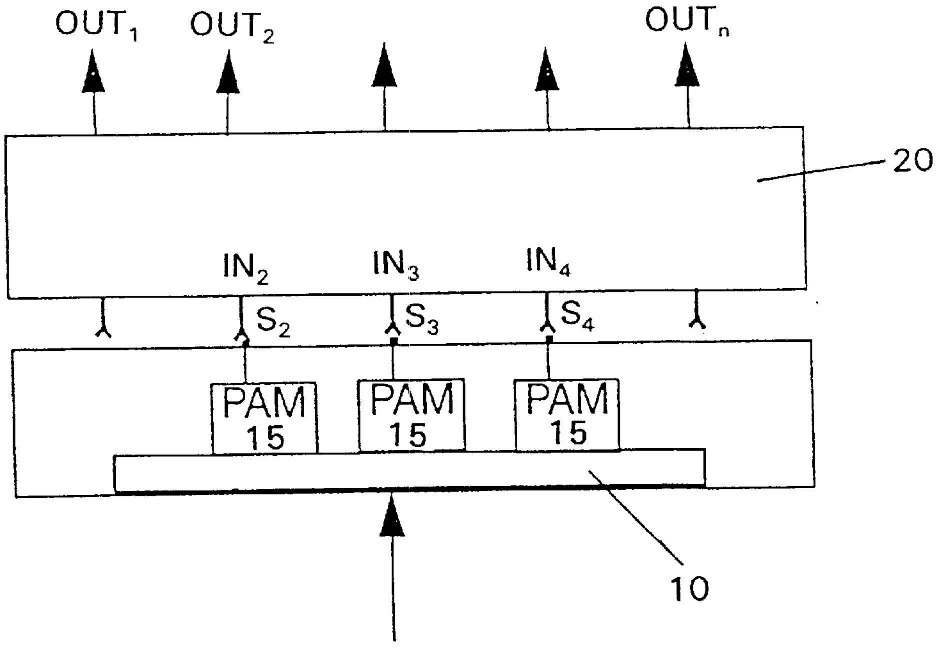
FIG. 2 illustrates an arrangement according to the present invention presenting a measurement configuration having an over-dimensioned matrix for an active antenna for transmit.

In testing active transmit antennas having a number n of distributed power amplifiers modules PAM corresponding to radiators or groups of radiators, the same additional combiner network, e.g., Butler matrix, may be used if it is dimensioned for a maximum port number of n. FIG. 2 illustrates a measurement arrangement using such an over-dimensioned combiner for measurements of an active transmit antenna with only three power amplifier modules. Here outputs $S_2$, $S_3$ and $S_4$ from corresponding distributed power amplifier modules 15 are feeding inputs $IN_2$, $IN_3$ and $IN_4$ of the additional combiner network 20 having n input terminals and n output terminals. Unused input terminals and output terminals are terminated according to the state of the art when operating with an over-dimensioned matrix.

Figure 3:
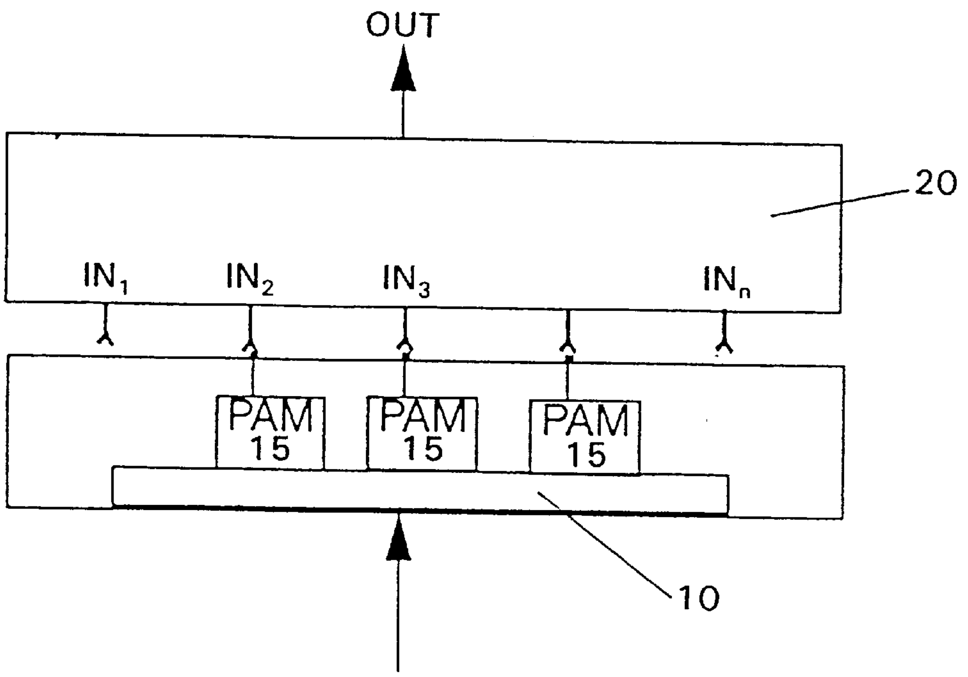
FIG. 3 illustrates an arrangement according to the present invention presenting a measurement configuration having a distribution network for equal phase.

If only a signal level in a straight forward direction from the active antenna is desired the additional combiner network may be reduced to a simpler network of equal phase with n input terminals and one output terminal. This is illustrated in another embodiment of the present invention as demonstrated by FIG. 3.

Figure 4:
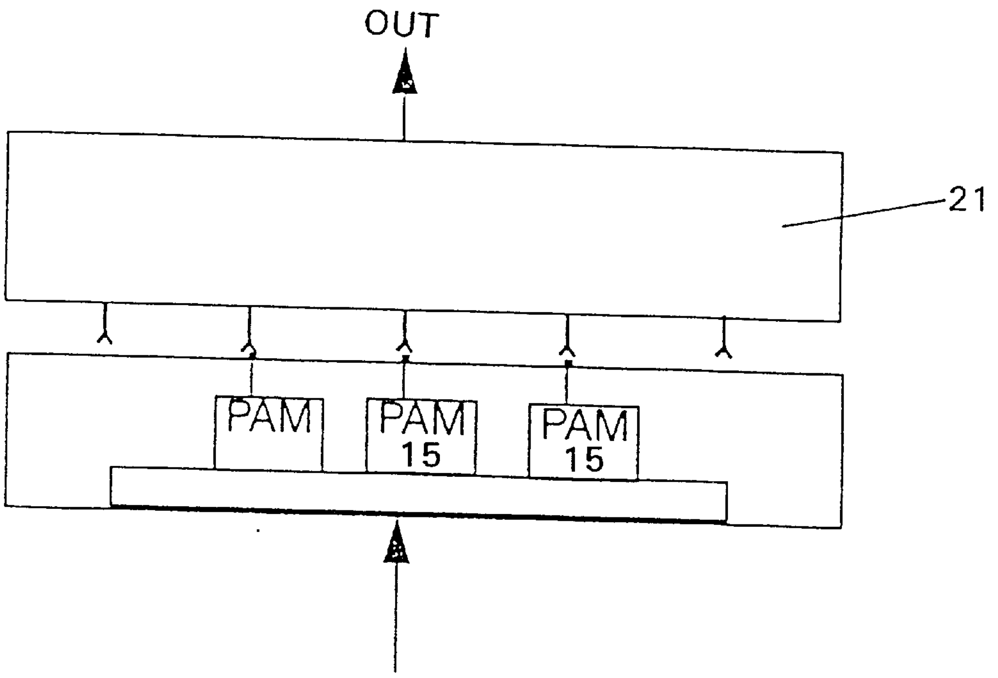
FIG. 4 illustrates an arrangement according to the present invention presenting a measurement configuration having a distribution network for one phase gradient.

FIG. 4 demonstrates still another embodiment of the present invention for measurement of the transmit signal level in an arbitrary direction from the active antenna. The additional combiner network is reduced to an additional measurement combiner network 21 having a phase gradient. By changing the phase gradient by means of phase shifters, delay lines or the like, the signal strength will be obtained in another chosen direction of radiation. Equal to FIG. 3 the combiner network 21 of FIG. 4 has n input terminals and one output terminal.

Figure 5:
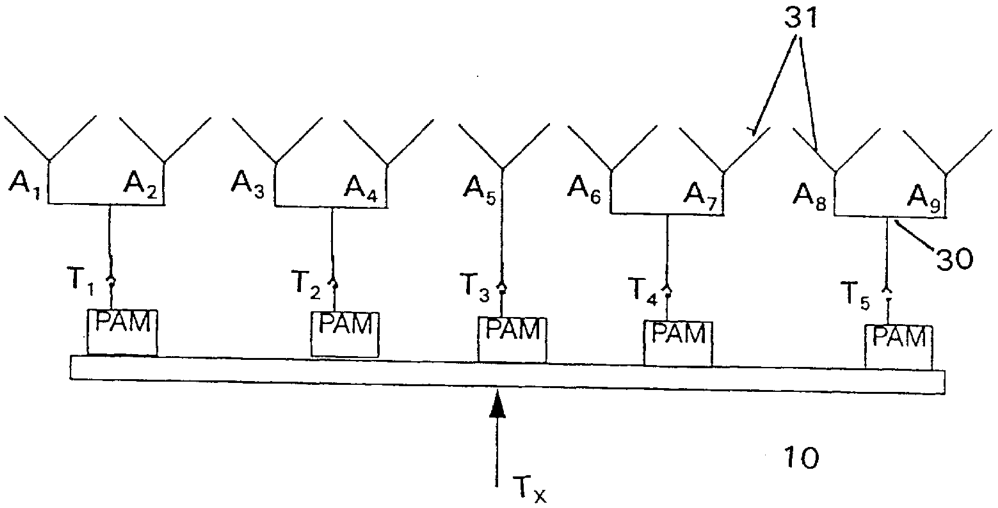
FIG. 5 illustrates an example of an active transmit antenna having a non-constant amplitude distribution.
Figure 6:
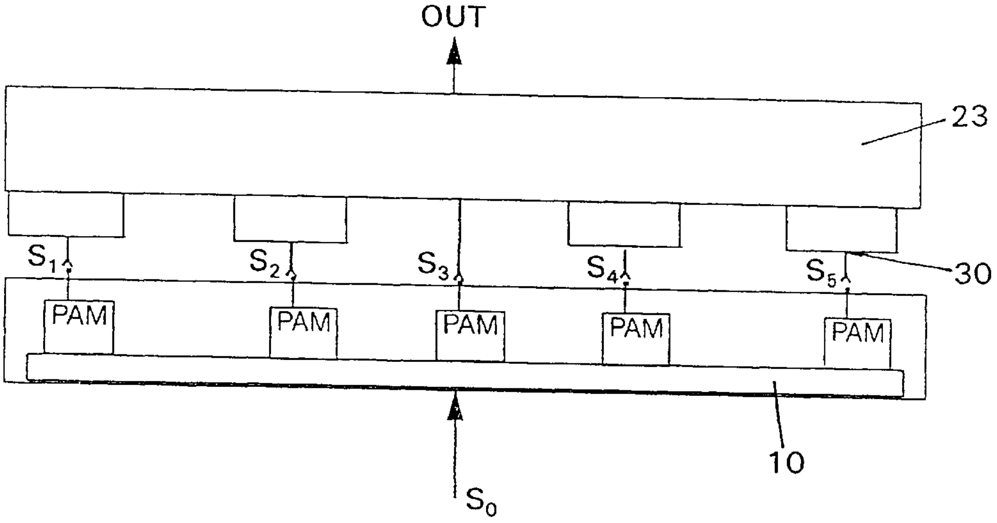
FIG. 6 illustrates an example of a measurement configuration with a distribution network of an active transmit antenna according to FIG. 5 for one phase gradient.

Antenna systems having passive distribution networks between the radiation elements and the power amplifier modules PAM may also be tested by introducing power dividers and/or phase shifting members to imitate the antenna function. This method may be combined with the cases illustrated in FIGS. 2–4. An active antenna for transmission with a non-constant amplitude distribution is illustrated in FIG. 5 and a corresponding arrangement for measurement according to the present invention using an additional measurement combiner network 21 having a phase gradient. It should be noted that the input terminals of the additional combiner network are connected to the points where the individual radiators 31 are connected to the passive combiners 30. Thus, in the example there will be needed a number of input terminals of the additional combiner network 23 corresponding to the number of radiators 31 as is demonstrated in FIG. 6. This measurement arrangement will produce a measured signal for one phase gradient and one signal direction at a time. Thus, an additional combiner according to the invention having a configuration adopted for the particular active transmit antenna array will in a simple way be able to produce measures in production and testing of such active transmit antenna arrays.

Figure 7:
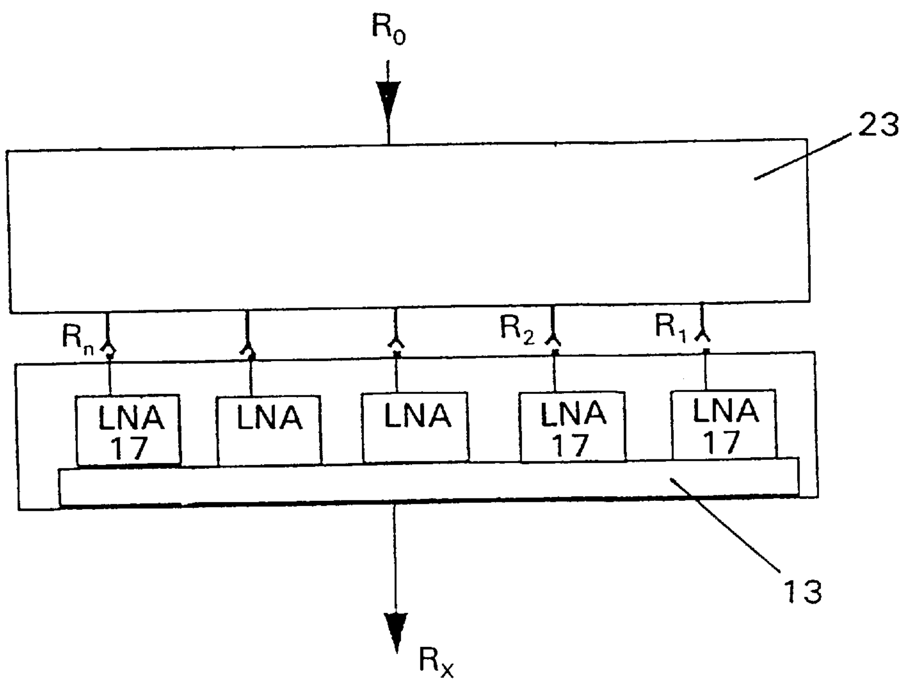
FIG. 7 illustrates an example of an arrangement according to the present invention for creating a virtual antenna reference point for an active receive antenna.

FIG. 7 demonstrates a corresponding measurement according to the present invention for an active receive antenna setup utilizing the additional combiner network for inserting a test signal $R_0$ into the entire array of distributed low noise amplifiers, which via a receiver combiner combines all the amplified antenna signals into an output terminal for a receiver. In FIG. 7 terminals corresponding to inputs $IN_1$, $IN_2$ . . . $IN_n$ of the additional combiner network according to FIG. 1 are connected to a corresponding contact of one radiating element. The contact is connected directly or via a passive combiner to a low noise amplifier, LNA 17, of the active receive antenna. The radiator configuration in a receive mode may for instance be corresponding to the transmit configuration of FIG. 5. Exchanging then only the PAM:s to LNA:s and changing the direction of arrow $T_0$ in the opposite direction we obtain a configuration of FIG. 7 with the arrow $R_x$. Then a suitable terminal, previously used as output of the additional combiner network 23 when examining transmit characteristics, is connected to the test signal generator supplying a test signal $R_0$ for the measurement of the performance of the active receive antenna.

In other words the method according to the present invention for measuring characteristics of an active transmit antenna described above may also in a corresponding way be utilized to measure and determine the receive characteristics of the system with the help of a virtual receive antenna reference point.

Figure 8:
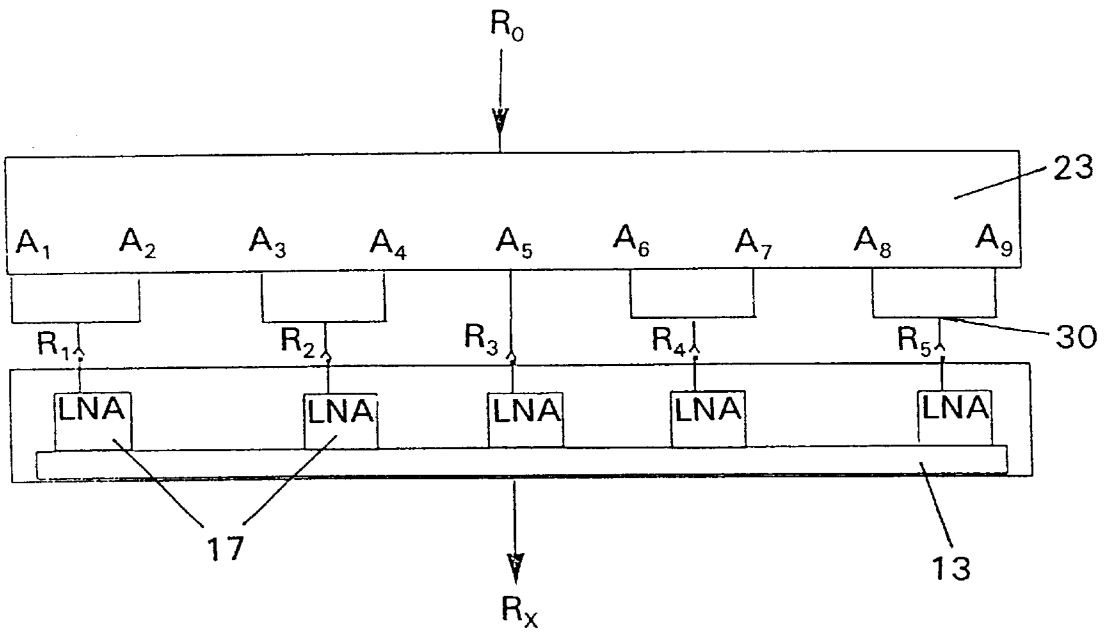
FIG. 8 illustrates another example of an arrangement according to the present invention for creating a virtual antenna reference point for an active receive antenna corresponding to the arrangement in FIG. 6 shown for a transmit antenna.

According to the present invention a measurement of an active receive antenna corresponding to the active transmit antenna demonstrated in FIG. 5 is illustrated in FIG. 8. A test signal $R_0$ is applied to the additional combiner network 23, the ports of which will then correspond to the radiators $A_1$–$A_9$ of FIG. 5 but in this case connected to low noise amplifiers 17 instead of power amplifier modules 15 as in the transmit case. Like in FIG. 6 radiating elements $A_1$ and $A_2$, $A_3$ and $A_4$, $A_6$ and $A_7$, $A_8$ and $A_9$, respectively, are combined by means of passive combiners 30. This gives in this case five receive signals $R_1$–$R_5$ applied to the low noise amplifiers 17 the outputs of which then being combined by means of a further receive combiner 13. The output obtained at the output terminal $R_x$ will reproduce the response of the active receive antenna. Thus the utilization of the method using the additional combiner network will produce a simple and accurate way of establishing measurements according to standards for active receive antennas. A procedure according to the state of the art for a simultaneous measurement of the entire active receive antenna system would be time consuming and costly and require specific space for setting up an environment for the antenna measurement test range permitting test signals down to the order of at least −110 dBm.

Thus, an additional combiner according to the invention having a configuration adopted for the particular active transmit or receive antenna array will simply be able, in production and testing, to produce characteristics of such an active distributed antenna system according to a standard procedure.

A measurement system for applying the present method will simply be built up. Such a measurement system will comprise an additional combiner network according to the alternative embodiments of the method disclosed. The additional combiner has a number of input and output terminals and terminating means to terminate unused input and output terminals. Additionally the measurement system incorporates a generator means (not shown) generating a first test signal $S_0$ to be applied to a primary test input terminal at a distributing circuitry feeding distributed power amplifiers of an active antenna system for measurement of transmit characteristics of the active transmit antenna, or generating a second test signal $R_0$ to be applied to a secondary test signal input terminal of the additional combiner network for measurement of active receive antenna characteristics in an active antenna system. A person skilled in the art will realize that as a generator means may, for instance, be used the actual transmit driver intended for the active antenna system if suitably adapted for the measurement to be performed. Finally the measurement system contains a metering system (not shown) for evaluating amplitude or phase values at a measurement output terminal of said additional combiner network for obtaining a measured virtual active transmit antenna reference point or for evaluating amplitude values at a measurement output terminal of a distributed receiving amplifier combining circuitry for obtaining a measured virtual active receive antenna reference point. A person skilled in the art will realize that as the metering system a standard vector voltmeter may be utilized or even the actual receiver system for the active antenna could be utilized as a measurement tool if properly adapted. The measurement system disclosed will form an excellent tool in production and in testing for certifications according to standards like GSM, DCS.and PDC in mobile telephone service systems.

A measurement system according to the present method may utilize different types of additional combiner network, for instance a network providing an equal phase combination, a network providing a controllable phase gradient or a Butler matrix.

It will be appreciated by those of ordinary skill in the art that the present invention can be embodied in other specific forms, e.g. radiating elements or groups of elements placed on nonplanar surfaces, without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method for measuring characteristics of an active distributed antenna system having a distributing circuitry for distributed power amplifier modules for transmit or distributed low noise amplifiers connected to a combiner circuitry for receiving, comprising the steps of:

arranging an additional combiner network having a number of input terminals and at least one output terminal;

connecting said additional combiner network simultaneously to all the distributed power amplifier modules when measuring transmit characteristics or to all the distributed low noise amplifiers when measuring receive characteristics;

generating a test signal; and applying said test signal such that said additional combiner network forms a spatial transform of said test signal, thereby in the measurement of active antenna characteristics replacing an antenna element array of said active distributed antenna system.

2. The method according to claim 1, comprising the further steps of:

connecting a signal output terminal of a distributed power amplifier module, normally connected to a radiating element or a group of radiating elements, to a corresponding input terminal of said additional combiner network;

applying said test signal to an input terminal of said distributing circuitry feeding said distributed power amplifiers said input terminal of said distributing circuitry acting as a primary test signal input terminal;

terminating all unused input and output terminals of said additional combiner;

measuring an amplitude value from at least one not terminated output terminal of said additional combiner; and analyzing signal properties of the active distributed antenna system and thereby creating a measured virtual active transmit antenna reference point.

3. The method according to claim 1, comprising the further step of arranging said additional combiner network having a number of signal input terminals and at least one output terminal and an equal phase combination for signals applied to said input terminals, thereby determining an amplitude value at said one output terminal of said additional combiner network said amplitude value corresponding to a central forward direction of the active distributed transmit antenna system.

4. The method according to claim 1, comprising the further step of arranging said additional combiner network having a number of signal input terminals and at least one output terminal and producing a controllable phase gradient for signals applied at said input terminals, thereby determining an amplitude value at said one output terminal of said additional combiner network, this amplitude value corresponding to the radiation level in a certain direction from the active distributed transmit antenna system.

5. The method according to claim 1, comprising the further step of arranging said additional combiner network in the form of a Butler matrix.

6. The method according to claim 1, comprising the further step of arranging said spatial transform as a Fourier transform.

7. A method for measuring characteristics of an active distributed antenna system having a distributing circuitry for distributed power amplifier modules for transmit or distributed low noise amplifiers connected to a combiner circuitry for receiving, comprising the steps of:

arranging an additional combiner network having a number of input terminals and at least one output terminal;

connecting said additional combiner network to the distributed power amplifier modules when measuring transmit characteristics or to the distributed low noise amplifiers when measuring receive characteristics;

generating a test signal;

applying said test signal such that said additional combiner network forms a spatial transform of said test signal, thereby in the measurement of active antenna characteristics replacing an antenna element array of said active distributed antenna system;

connecting a signal output terminal of a distributed power amplifier module, normally connected to a radiating element or a group of radiating elements, to a corresponding input terminal of said additional combiner network;

applying said test signal to an input terminal of said distributing circuitry feeding said distributed power amplifiers said input terminal of said distributing circuitry acting as a primary test signal input terminal;

terminating all unused input and output terminals of said additional combiner;

measuring an amplitude value from at least one not terminated output terminal of said additional combiner;

analyzing signal properties of the active distributed antenna system and thereby creating a measured virtual active transmit antenna reference point;

measuring a phase value from at least one not terminated output terminal of said additional combiner;

combining measurements of amplitude and phase for each measured not terminated output terminal; and calculating an active transmit antenna system radiation characteristics by means of said created virtual antenna reference point information and known characteristics of the radiating elements.

8. A method for measuring characteristics of an active distributed antenna system having a distributing circuitry for distributed power amplifier modules for transmit or distributed low noise amplifiers connected to a combiner circuitry for receiving, comprising the steps of:

arranging an additional combiner network having a number of input terminals and at least one output terminal;

connecting said additional combiner network to the distributed power amplifier modules when measuring transmit characteristics or to the distributed low noise amplifiers when measuring receive characteristics;

generating a test signal;

applying said test signal such that said additional combiner network forms a spatial transform of said test signal, thereby in the measurement of active antenna characteristics replacing an antenna element array of said active distributed antenna system;

terminating all unused input and output terminals of said additional combiner;

connecting every not terminated input terminal of said additional combiner network to a separate input terminal of a distributed low noise amplifier of an active receive antenna in said active distributed antenna system, said low noise amplifier normally connected to an antenna element or a group of antenna elements;

feeding said test signal to a not terminated output terminal of said additional combiner, said output terminal in a receive characteristics measurement acting as a secondary test signal input terminal;

measuring a test signal value at an output of the distributed receiving amplifier combining circuitry; and analyzing signal properties of said active distributed antenna system and thereby creating a measured virtual receive antenna reference point.

9. The method according to claim 8, comprising the further step of arranging said additional combiner network having an equal phase combination for a signal applied to said secondary test signal input terminal, thereby determining an amplitude value at said output of the distributed receiving amplifier combining circuitry, this amplitude value then corresponding to a signal reception level in a central forward direction of said active receive antenna.

10. The method according to claim 8, comprising the further step of arranging said additional combiner network producing a controllable phase gradient for the signal applied at said secondary test signal input terminal, thereby determining an amplitude value at said output of the distributed receiving amplifier combining circuitry, this amplitude value then corresponding to a signal reception level in a certain direction of said active receive antenna.

11. A measurement system for measuring characteristics of an active distributed antenna system having a distributed circuitry for distributed power amplifier modules for transmit or distributed low noise amplifiers connected to a combiner circuitry for receiving, comprising a combiner network having a number of input terminals and output terminals, said combiner network being connected simultaneously to all the distributed power amplifier modules when measuring transmit characteristics or to all the distributed low noise amplifiers when measuring receive characteristics;

terminating means for unused input terminals and output terminals of said combiner network;

a generator means generating a first test signal to be applied to a primary test signal input terminal at the distributing circuitry feeding the distributed power amplifiers of the active distributed antenna system for measurement of transmit characteristics of an active transmit antenna; and a metering system for evaluating amplitude or phase values at a measurement output terminal of said combiner network for obtaining a measured virtual active transmit antenna reference point.

12. The system according to claim 11, wherein said combiner network provides an equal phase combination for signals applied to said primary test signal input terminal.

13. The system according to claim 11, wherein said combiner network provides a controllable phase gradient for signals applied at said primary test signal input terminal.

14. A measurement system for measuring characteristics of an active distributed antenna system having a distributed circuitry for distributed power amplifier modules for transmit or distributed low noise amplifiers connected to a combiner circuitry for receiving, comprising a combiner network having a number of input terminals and output terminals, said combiner network being connected simultaneously to all the distributed power amplifier modules when measuring transmit characteristics or to all the distributed low noise amplifiers when measuring receive characteristics;

terminating means for unused input terminals and output terminals of said combiner network;

a generator means generating a second test signal to be applied to a secondary test signal input terminal of said combiner network for measurement of receive characteristics of the active distributed antenna system; and a metering system for evaluating amplitude values at a measurement output terminal of the distributed receiving amplifier combining circuitry of the active distributed antenna system for obtaining a measured virtual active receive antenna reference point.

15. The system according to claim 14, wherein said combiner network provides an equal phase combination for a signal applied to said secondary test signal input terminal.

16. The system according to claim 14, wherein said combiner network provides a controllable phase gradient for a signal applied to said secondary test signal input terminal.

* * * * *